G. JANSSEN & L. BAUGH, Jr.
Machine for Making Fertilizers.
No. 228,641. Patented June 8, 1880.
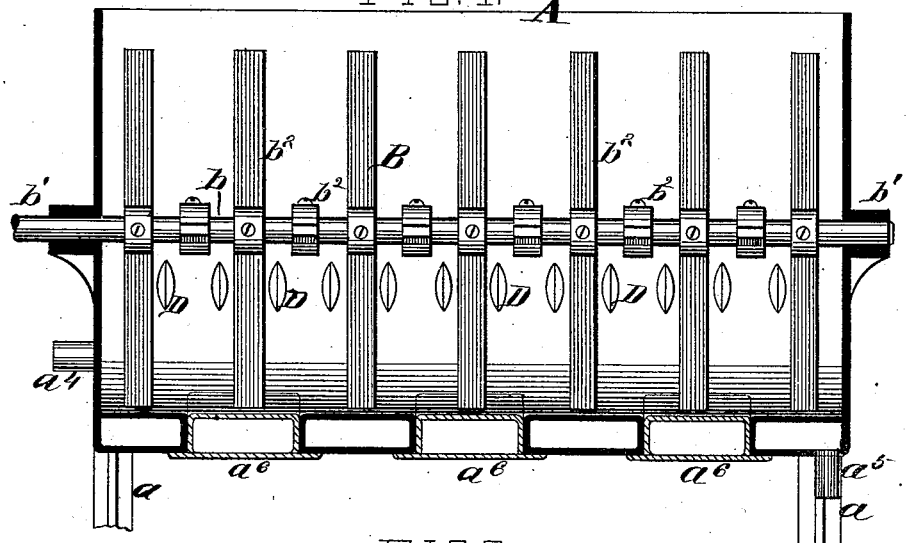
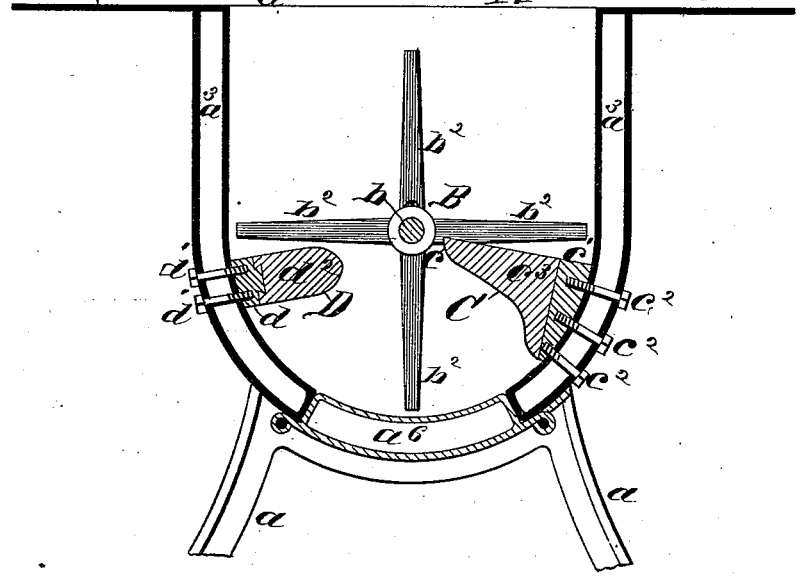
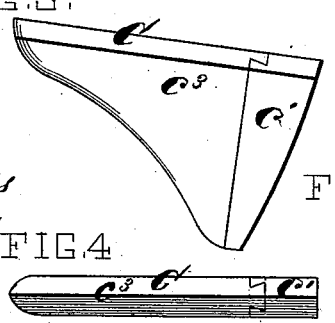
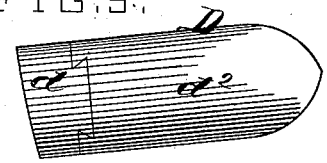
ATTEST,
Charles Pickles
S. Henry Smith
INVENTORS,
Gustave Janssen.
Levi Baugh, Jr.
by C. D. Moody, atty.

UNITED STATES PATENT OFFICE.

GUSTAVE JANSSEN, OF ST. LOUIS, MISSOURI, AND LEVI BAUGH, JR., OF EAST ST. LOUIS, ILLINOIS.

MACHINE FOR MAKING FERTILIZERS.

SPECIFICATION forming part of Letters Patent No. 228,641, dated June 8, 1880.

Application filed August 26, 1879.

*To all whom it may concern:*

Be it known that we, GUSTAVE JANSSEN, of St. Louis, Missouri, and LEVI BAUGH, Jr., of East St. Louis, Illinois, have jointly made a new and useful Improvement in Machines for Making Fertilizing Compounds, of which the following is a full, clear, and exact description, reference being had to the annexed drawings, making part of this specification, in which—

Figure 1 is a vertical longitudinal section of the improved machine. Fig. 2 is a vertical cross-section of the same. Figs. 3 and 4 represent a side and a top view, respectively, of one of the blades used on one side of the machine, and Figs. 5 and 6 represent a side and a cross-sectional view of one of the blades used on the opposite side of the machine.

The same letters denote the same parts.

The present invention relates to an improvement in machines for making fertilizers and fertilizing compounds from tank-stock, blood, and refuse meats.

In its general construction it consists of a vessel, to the exterior of which heat can be applied, which is open at the top, and which has within it an agitator for stirring and lifting the fertilizer material while being prepared and a system of knives or blades for cutting the material and for preventing it from balling or clodding during the operation. Now, machines answering to this general description have heretofore been used; but to enable our present purpose to be carried out certain details in construction become essential. The heat must be applied uniformly to all that portion of the vessel occupied by the material being treated—that is, the heat must be applied not only at the immediate bottom of the vessel, but as high up on the sides thereof as the top of the contents being heated. The vessel should be wide open at its top to allow the moisture to pass off, and it should be substantially semi-cylindrical. The agitator must be arranged centrally in the vessel, and the agitator-arms must extend evenly and entirely through all that portion of the vessel which is heated and as closely to the shell of the vessel as is practicable, in order that every portion of the material be reached and evenly stirred, especially that portion which occupies the lowest portion of the vessel. Further, the blades must be made to interlock the agitator-arms, the points of the blades extending almost to the agitator-shaft, and the agitator-arms, in turn, reaching, as above stated, nearly to the shell of the vessel, for it is important that the operation be effected in the quickest time practicable in order to avoid loss of the ammonia, which is the chief value of the fertilizer, and, also, that the material when prepared be thoroughly and finely granulated; and to secure these results the fertilizer material must be constantly, thoroughly, and evenly stirred, overturned, broken up, and cut while being heated, and if not thus agitated and treated the product is lumpy and otherwise injuriously affected.

In the annexed drawings, A represents the improved vessel, it being semi-cylindrical and arranged horizontally, resting on the feet $a\ a$. It is open at the top $a'$, and is provided with shelves $a^2\ a^2$, on which the meat can be supported before being put in the vessel. The vessel is made to be heated by jacketing it, and providing a space, $a^3$, through which steam is caused to circulate, entering, say, at $a^4$, and having an outlet, $a^5$, for the discharge of the condensed water. This mode of heating enables the operator to control the temperature of the vessel during the operation.

B represents the agitator, consisting of a shaft, $b$, journaled at $b'\ b'$, and having a series of arms, $b^2\ b^2$, the shaft being arranged centrally in the vessel and its arms extending nearly to the shell of the latter.

C C represent a series of stationary blades or knives arranged along and attached to one side of the vessel. The preferable shape of these knives is shown in Figs. 3 and 4. They are extended to bring the points $c\ c$ nearly to the shaft $b$.

D D represent another series of knives, blades, or projections attached to the opposite side of the vessel. The preferable shape of these last-named knives is shown in Figs. 5 and 6, being elliptical in vertical cross-section and not extending as far toward the agitator-shaft as the knives C C. As they are liable to breakage, both the knives C C and D D are made detachable, as follows: A head, $c'$ and $d$, is attached, by means of bolts $c^2\ d'$, to the vessel, and the blades $c^3$ $d^2$ are attached to the heads by means of a dovetail, as shown. This enables the blades to be readily removed and replaced.

The operation is as follows: The various forms of meat from which the fertilizer is to be made having been placed within the vessel, the latter is heated to the proper temperature and in the manner described. As the meat is being heated the agitator is rotated. The arms $b^2$ $b^2$ serve to stir up the meat and to lift it from the lower part of the vessel. We have ascertained, however, that this agitating and overturning of the meat is not of itself sufficient to produce a good result, especially in preparing the fertilizer from such parts of the animal as livers, lungs, melts, and blood. Accordingly it becomes necessary to employ the knives C C. The agitator is rotated so that the arms $b^2$ descend upon these knives. The effect is to bring the contents being treated again and again against the knives C C, and finally to thoroughly pulverize them. The operation is forwarded by using the opposite series, D D, of knives. The latter are, in vertical cross-section, of the shape shown, to co-operate with the agitator in breaking and cutting the meat, and at the same time to prevent the meat from adhering to the knives and clogging the machine, and they are preferably shorter than the other knives, to enable the meat to be lifted up by the agitator and carried over and dropped onto the points of the knives C C, which, being nearer the shaft $b$, enable the meat to be more easily cut. When thoroughly dried and pulverized the product is discharged through the doors $a^6$.

We claim—

1. The combination of the semi-cylindrical vessel A, open at the top, and having the steam-space $a$ extending all around the bottom and sides of the vessel, the agitator B, consisting of the shaft $b$ and arms $b^2$ $b^2$, and the knives C C, said shaft and arms being arranged and extended, and said arms and knives interlocking, substantially as described, and for the purposes set forth.

2. The combination of the semi-cylindrical vessel A, open at the top, and having the steam-space $a$ extending all around the bottom and sides of the vessel, the agitator B, consisting of the shaft $b$ and arms $b^2$ $b^2$, and the knives C C and D D, said shaft and arms being arranged and extended, and said arms and knives interlocking, substantially as described, and for the purposes set forth.

G. JANSSEN.
LEVI BAUGH, JR.

Witnesses:
CHAS. D. MOODY,
L. PULLIAM.